United States Patent Office 3,059,438
Patented Oct. 23, 1962

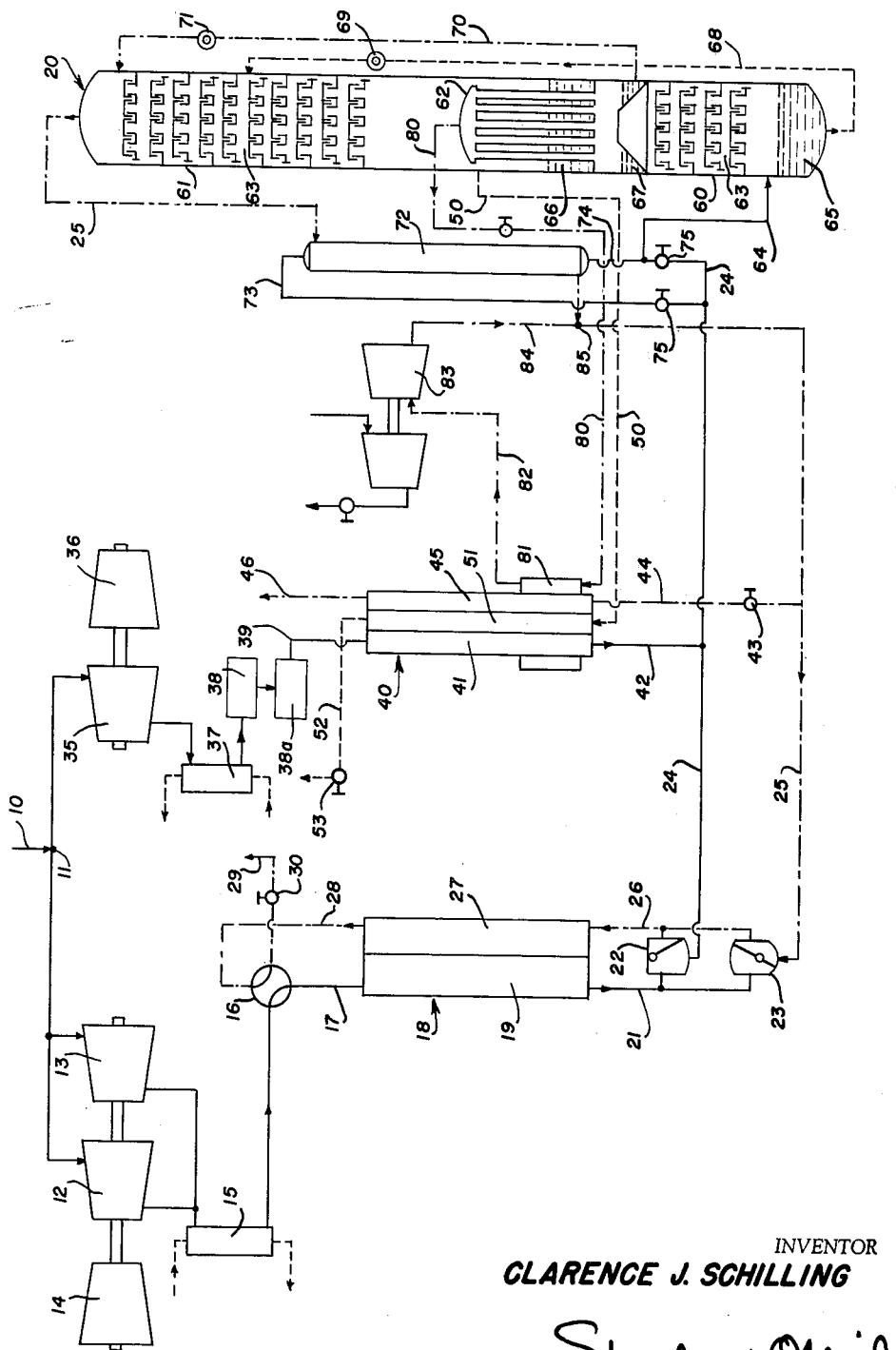

3,059,438
APPARATUS AND METHOD FOR
FRACTIONATION OF GAS
Clarence J. Schilling, Allentown, Pa., assignor, by mesne assignments, to Air Products and Chemicals, Inc., Trexlertown, Pa., a corporation of Delaware
Original application May 13, 1957, Ser. No. 660,023. Divided and this application June 23, 1959, Ser. No. 822,387
11 Claims. (Cl. 62—13)

The present invention relates to an improved method and apparatus for separating air into its components by low temperature fractionation employing heat exchange between air to be fractionated and the cold products of the fractionation.

The use of large quantities of gaseous oxygen in connection with blast furnace and steel plant operation, in the synthesis of liquid fuel from gaseous hydrocarbons and other manufacturing operations is becoming of increasing importance. Such uses require large tonnages of gaseous oxygen at a relatively low cost. In the production of gaseous oxygen, which may be either pure or impure, air is first compressed to an elevated pressure and then cooled by heat exchange with backwardly returning cold component gases. The cold compressed air is separated by liquefaction and rectification into low pressure cold gaseous oxygen and nitrogen components, which are returned backwardly and warmed by heat exchange with countercurrently flowing compressed air. Argon may be additionally separated where desirable. The cycle is continuous and the heat exchange between the incoming compressed air and the countercurrently flowing gaseous components may be effected in tubular heat exchanger means or in indirect heat exchange means, sometimes termed accumulators. An accumulator includes a chamber filled with heat absorbing material. A cold component gas is flowed through the chamber to cool the heat absorbing material in the chamber. The flow of cold gas is interrupted and then air is flowed in the opposite direction through the chamber and cooled. The accumulators are operated in pairs for each component gas, the flow of air and cold component gas through each pair of accumulators being periodically reversed. There may, of course, be more than one pair of accumulators for each component gas. It will be thus apparent that the heat exchange between the compressed air and the countercurrently flowing component gas is effected indirectly.

With tubular heat exchangers, the compressed air is flowed along a path or passage through the heat exchanger in heat exchange relationship with one or more cold component gases flowing along a separate path or passage, the heat exchange being effected through walls of the passages between the stream of air and at least one countercurrently flowing stream of component gas. The passages need not have any particular cross sectional shape, the term tubular being used as a convenient term for all forms in which heat is transferred through walls of passages. In switching heat exchangers, the path of the compressed air stream and path of a cold component gas are alternated. All of these methods and apparatus for effecting heat exchange between air and one or more backwardly returning gaseous components are broadly referred to herein as heat interchange or heat exchange effecting relationship in the case of the methods, and heat interchangers or heat exchange effecting means in the case of the apparatus.

As used herein, the terms "oxygen component" and "nitrogen component" include pure oxygen or nitrogen, respectively, and oxygen and nitrogen-rich fractions of air, respectively. The purity of the component gas will depend, to a certain extent, upon its intended use. Other gaseous components of air, such as argon, may also be recovered separately in known manner without interfering with the functioning and principles of the present invention.

Air contains constituents boiling at a higher temperature than oxygen, for example, water and carbon dioxide. When air is cooled by heat interchange with one or more countercurrently flowing gaseous components, these higher boiling constituents are deposited in zones along the path of flow of the air. The removal of these constituents from the air prior to cooling is relatively expensive and it is more economical to permit these constituents to be deposited in the accumulator or the switching type exchanger and thereafter remove the deposited constituents by the counter-currently flowing component gas. In other words, the countercurrently flowing component gas sweeps out the higher boiling constituents. Carbon dioxide is particularly difficult to remove and there is a tendency for the carbon dioxide to build up and clog the passage or passages. This removal of deposited constituents is broadly referred to as "deriming." Deriming difficulties arise from the relatively large temperature difference existing between the countercurrently flowing streams in the region of the deposits.

The carbon dioxide is deposited in the zone in which the air is cooled to the solidification temperature of carbon dioxide gas. When the component gas, usually but not necessarily, nitrogen component gas, is flowed through the passage in the opposite direction, the nitrogen stream flowing through the zone of deposit of carbon dioxide has a lower temperature than the air stream had when it flowed through this zone. As a result, the component gas, despite its lower pressure, does not remove all of the carbon dioxide. Accordingly, various complicated methods have been proposed for reducing the temperature difference between the countercurrently flowing streams of air and component gas by increasing the effective mass of cooling component gas to air in deriming and preventing clogging of the passages.

It is an object of the present invention to provide an improved method and apparatus for the separation of gaseous mixures, such as the production of oxygen.

Another object of the present invention is to provide an improved method and apparatus for the separation of gaseous mixtures such as air which utilizes heat interchangers to freeze impurities out of a portion of the gaseous mixture and chemical clean-up to remove impurities from the remainder of the gaseous mixture with simultaneous compensation for refrigeration losses and balancing of the heat interchange system.

Still another object of the present invention is to provide a novel method and apparatus for the separation of gaseous mixtures by which improved heat exchange efficiency is obtained.

In accordance with the present invention, compressed gaseous mixtures such as air is cooled by heat interchange with countercurrently flowing low pressure nitrogen component gas and oxygen component gas. The refrigerated air is separated by rectification in two stages, a high pressure stage and a low pressure stage, into low pressure oxygen and nitrogen components. Congealable impurities are removed from a major portion of the air in a first heat interchanger path and the remaining minor portion of the air is cleaned up chemically and cooled in a second heat interchanger path. A preponderance of gaseous product of one cooling point, such as a major part of the nitrogen product in the separation of air, is relied upon to purge the first heat interchanger path, and the remaining nitrogen and the oxygen product is used to cool the minor portion of the air in the second heat exchanger path in such a manner as to improve the heat exchange efficiency. High pressure nitrogen component gas may be withdrawn from the high pressure stage and warmed by heat exchange with the second heat interchanger path to control the temperature of the minor portion of the air, and the warmed high pressure nitrogen component gas may be expanded with work to provide refrigeration for the system.

These and other objects and advantages of the present invention will become more apparent from the following description taken with the accompanying drawing, which discloses an air fractionating system embodying the principles of the present invention. It is to be expressly understood, however, that the drawing is designed for purposes of illustration only and as a definition of the limits of the invention reference for the latter purpose being had to the appended claims.

Referring to the drawing, air which has been previously cleaned of dust, enters the system conduit 10 and at point 11 this air supply is divided with a major portion, for example, 67% of the air, being compressed in a pair of turbo-compressors 12 and 13 driven by suitable power means 14. The air compressed to a suitable pressure, for example, about 100 lbs. per square inch absolute flows from the compressors through aftercooler 15 and then to a reversing valve 16. With the valve 16 in the position shown, compressed air flows through a conduit 17 to an interchanger 18 and flows down through interchanger passage 19, being cooled therein by heat exchange with cold nitrogen component gas returning from a fractionating column 20 described in detail below. The refrigerated air leaves the bottom of the interchanger 18 through conduit 21 connected to flap valves 22 and 23. Air under pressure in conduit 21 biases the flap valves to the positions shown and the refrigerated air flows through valve 22 to conduit 24 and then to the fractionating column.

With the reversing valve 16 in the position shown, cold and dry nitrogen component gas at a low pressure substantially the same as the low pressure maintained in the low pressure stage of the fractionating column flows from conduit 25, through valve 23 and conduit 26 to the interchanger 18, upwardly through passage 27 and leaves the interchanger through conduit 28. The warmed nitrogen gas flows through conduit 28 to reversing valve 16, and is discharged from the system through conduit 29 provided with back pressure control valve 30. As the air flows down through passage 19 congealable material, for example, carbon dioxide, is deposited in the passage. Periodically the reversing valve 16 is rotated through a quarter turn to switch the air and nitrogen passes so that air will flow downwardly through passage 27 and nitrogen gas will flow upwardly through passage 19. For reasons set out below, the upwardly flowing stream of nitrogen carries all previously congealed material, such as the carbon dioxide.

In order to reduce the temperature difference between the refrigerated air and the cold nitrogen component gas at the lower end of the interchanger, a larger mass of one component gas, such as nitrogen component gas in the case of air separation, is passed upwardly through the interchanger 18 than the mass of air passing down through the interchanger. For example, the nitrogen component gas may comprise about 70% of the total component gas and may be passed upwardly through the interchanger to cool about 67% of the air. Nitrogen component gas comprising about 70% of the total component gases 18 in sufficient quantity to establish a purging action at the efficient temperature difference with which the interchanger is designed to operate when approximately 67% of the air is passed in heat exchange relation therewith. With the relatively larger mass of component nitrogen gas flowing up through the interchanger, the nitrogen component gas will completely remove deposited congealable material, particularly the carbon dioxide.

A minor portion of the air to be fractionated in the system, for example, 33% of the air, is compressed by the turbo-compressor 35 driven by power means 36, and then cooled in the aftercooler 37. The cooled compressed air flows through a carbon dioxide-removing unit 38 in which the carbon dioxide is reduced to unobjectable proportions by chemical means, for example, and a drier 38a. From the unit 38 the minor portion of air flows through conduit 39 to interchanger 40 and down through interchanger passage 41 to conduit 42. As the air flows through the interchanger 40, it is cooled by heat exchange with component gases flowing backwardly from the fractionating column as described below. The refrigerated compressed air flows through the conduit 42 to the conduit 24, where the minor portion of the refrigerated air is mixed with the major portion of refrigerated air from interchanger 18 before flowing to the fractionating column.

The portion of cooled low pressure nitrogen component gas which does not flow through the interchanger 18 is passed from the conduit 25 through control valve 43 and conduit 44 to interchanger 40. This portion of the nitrogen component gas flows through passage 45 in heat exchange relationship with the air stream flowing through passage 41 and leaves the upper end of the interchanger through conduit 46. The valve 43 controls the proportionment of low pressure nitrogen component gas between the interchangers 18 and 40.

Cold oxygen component gas from the fractionating column flows continuously from conduit 50 up through passage 51 of the interchanger 40, and the warmed oxygen gas leaves the interchanger passing to header 52 and out of the system through valve 53.

The fractionating column 20 may be of any conventional design such as a two-stage column including a high pressure section 60 and a low pressure section 61 separated by a refluxing condenser 62. Each of the sections are provided with liquid-vapor contact means such as bubble plates 63. Air feed is introduced into the high pressure section through conduit 64 and therein the air undergoes preliminary separation producing liquid crude oxygen collecting in a pool 65 in the base of the high pressure section and gaseous nitrogen which flows upwardly into the condenser 62 and is liquefied upon heat exchange with liquid oxygen product collecting in a pool 66 in the base of the low pressure section, liquefied nitrogen flows downwardly from the condenser with a part entering the high pressure section as reflux and another part collecting in a pool 67 below the condenser. Liquid crude oxygen collecting in the pool 65 is passed through conduit 68 and expansion valve 69 and introduced at an intermediate point in the low pressure section as feed, while liquid nitrogen collecting in pool 67 passes through conduit 70 and expansion valve 71 and is introduced into the upper end of the low pressure section as reflux. Gaseous low pressure nitrogen is withdrawn from the top of the column through conduit 25 and passed to the heat exchangers 18 and 40 as described above. If desired the low pressure nitrogen may be passed through heat exchanger 72, for interchange with part of the air feed, before entering the heat exchangers 18 and 40. A portion of the air feed may be passed through the heat exchanger 72 by way of conduits 73 and 74 and valves 75, 75 may be provided for controlling the quantity of the air so passed. Oxygen in a desired state of purity, ordinarily 95% or over is withdrawn from the low pressure section above the pool 66 through conduit 50 and conducted to pass 51 of heat exchanger 40 as described above.

About 30% of the component gases, comprising the total oxygen component gas and the portion of the nitrogen component gas which does not flow through the interchanger 18, flows up through the interchanger 40 in heat exchange with about 33% of the total amount of air. Thus, the mass of air cooled in interchanger 40 is larger than the mass of low pressure component gases flowing up through the interchanger. If it is desired to cool the air in the interchanger 40 to about the same temperature that the air is cooled in interchanger 18, high pressure nitrogen gas may be withdrawn from the high pressure section of the fractionating column through conduit 80 connected to the dome of the refluxing condenser 62, and flowed through passageway 81 in heat exchange relationship with the air flowing through interchanger 40. The warmed high pressure nitrogen flows from the passageway 81 through conduit 82 to an expansion engine 83 and the expanded nitrogen gas flows through conduit 84 to join the low pressure nitrogen component gas at point 85.

The fractionating cycle described above includes features which mutually cooperate to provide advantages not present in the prior art including increased operating efficiency. For example, the concept of removing impurities such as carbon dioxide from a portion of the air feed outside of an air-cold product heat exchanger not only makes it possible to obtain nitrogen product uncontaminated with impurities but results in improved heat exchange efficiency between the oxygen product and a portion of the air feed. This results from the pressure of the nitrogen stream flowing through pass 45 of heat exchanger 40 which improves the cooling curves of the heat exchanger and results in more efficient heat interchange as compared to the passing of only oxygen and air in countercurrent heat exchange relationship. Furthermore, with the present cycle balanced relationship between portions of the feed mixture and oxygen and nitrogen component gas may be obtained by passing a major portion of the air through a two pass heat exchanger. Elimination of the requirement to provide a third pass in a switching exchanger materially reduces manufacturing cost.

Although only one embodiment of the present invention has been disclosed and described herein, it is to be expressly understood that various changes and substitutions may be made therein without departing from the spirit of the invention as well understood by those skilled in the art. For example, the heat exchanger 18 may comprise a pair of switching accumulators if desired. Reference therefore will be had to the appended claims for a definition of the limits of the invention.

This application is a division of applicant's copending application Serial No. 660,023 filed May 13, 1957, now Patent No. 2,932,174, for Apparatus and Method for Fractionation of Gas.

What is claimed is:

1. The method of separating gaseous mixtures into components in which compressed gaseous mixture is refrigerated by heat interchange with cold component gas and supplied to a fractionating operation where the gaseous mixture is separated into cold component gases having different boiling points, comprising the steps of compressing gaseous mixtures to provide first and second portions of compressed gaseous mixture containing high boiling point impurity, flowing the first portion of compressed gaseous mixture in one direction through a first path and flowing a first portion of one component gas in the opposite direction in heat exchange effecting relation with the first path throughout the length of the first path during one period of the heat interchange to thereby cool the first portion of compressed gaseous mixture and congeal high boiling point impurity along the first path, flowing the first portion of one component gas through the first path in the opposite direction in contact with congealed impurity during the second period of the heat interchange, proportioning the relative mass of the first portion of one component gas and the first portion of compressed gaseous mixture so that the first portion of one component gas sweeps out congealed impurity during the second period of the heat interchange, passing the second portion of compressed gaseous mixture in one direction through a second path and flowing another component gas and a second portion of the one component gas in the opposite direction in heat exchange effecting relation with the second path throughout the length of the second path to thereby cool the second portion of compressed gaseous mixture, removing high boiling point impurity from the second portion of compressed gaseous mixture without the second path, and feeding the first and second portions of cool compressed gaseous mixture to the fractionating operation.

2. The method of separating gaseous mixtures into components in which compressed gaseous mixture is refrigerated by heat interchange with cold component gas and supplied to a fractionating operation where the gaseous mixture is separated into low boiling point cold component gas and high boiling point cold component gas, comprising the steps of compressing gaseous mixture to provide first and second portions of compressed gaseous mixture containing high boiling point impurity, flowing the first portion of compressed gaseous mixture in one direction through a first path and flowing a first portion of low boiling point component gas in the opposite direction in heat exchange effecting relation with the first path during one period of the heat interchange to thereby cool the first portion of compressed gaseous mixture and congeal high boiling point impurity along the first path, flowing the first portion of low boiling point component gas through the first path in the opposite direction in contact with congealed impurity during a second period of the heat interchange, proportioning the relative mass of the first portion of low boiling point component gas and the first portion of compressed gaseous mixture so that the first portion of low boiling point component gas sweeps out congealed impurity during the second period of the heat interchange, flowing the second portion of compressed gaseous mixture in one direction through a second path and flowing high boiling point component gas and a second portion of low boiling point component gas in the opposite direction in heat exchange effecting relation with the second path to thereby cool the second portion of compressed gaseous mixture, removing high boiling point impurity from the second portion of compressed gaseous mixture without the second path, and feeding the first and second portions of cool compressed gaseous mixture to the fractionating operation.

3. The method of separating air into oxygen component gas and nitrogen component gas in which compressed air is refrigerated by heat interchange with cold component gas and supplied to a fractionating zone where the air is separated into cold nitrogen component gas and cold oxygen component gas, comprising the steps of compressing air to provide major and minor portions of compressed air containing high boiling point carbon dioxide impurity, flowing the major portion of compressed air in one direction through a first path and flowing a first portion of nitrogen component gas in the opposite direction in heat exchange effecting relation with the first path during one period of the heat interchange to thereby cool the major portion of compressed air and congeal high boiling point carbon dioxide impurity along the first path, flowing the first portion of nitrogen component gas through the first path in the opposite direction in contact with congealed carbon dioxide impurity during a second period of the heat interchange, proportioning the relative mass of the first portion of nitrogen component gas and the major portion of compressed air so that the first portion of nitrogen component gas sweeps out congealed carbon dioxide impurity during the second period of the heat interchange, passing the minor portion of compressed air in one direction through a second path and flowing oxygen component gas and a second portion of nitrogen component gas in the opposite direction in heat exchange effecting relation with the second path to thereby cool the second portion of compressed air, removing high boiling point carbon dioxide impurity from the minor portion of compressed air without the second path, and feeding the major and minor portions of cool compressed air to the fractionating zone.

4. The method of separating gaseous mixtures into components in which compressed gaseous mixture is refrigerated by heat interchange with cold component gas and supplied to a fractionating operation where the gaseous mixture is separated into cold compressed gases having different boiling points, comprising the steps of compressing gaseous mixture to provide first and second portions of compressed gaseous mixture containing high boiling point impurity, flowing the first portion of compressed gaseous mixture in one direction through a first path and flowing a first portion of one component gas in the opposite direction in heat exchange effecting relation with the first path during one period of the heat interchange to thereby cool the first portion of compressed gaseous mixture and congeal high boiling point impurity along the first path, flowing the first portion of one component gas through the first path in the opposite direction in contact with congealed impurity during a second period of the heat interchange, proportioning the relative mass of the first portion of one component gas and the first portion of compressed gaseous mixture so that the first portion of one component gas sweeps out congealed impurity during the second period of the heat interchange, passing the second portion of compressed gaseous mixture in one direction through a second path and flowing another component gas and a second portion of one component gas in the opposite direction in heat exchange effecting relation with the second path to thereby cool the second portion of compressed gaseous mixture, removing high boiling point impurity from the second portion of compressed gaseous mixture without the second path, withdrawing a stream of cold fluid under high pressure from the fractionating operation, passing the withdrawn stream in heat exchange effecting relation with at least a portion of the second path to cool the second portion of compressed gaseous mixture to about the temperature of the first portion of compressed gaseous mixture leaving the first path and thereby warm the withdrawn stream, expanding the warm stream and adding the effluent of the expansion step to relatively low pressure fluid of the fractionating operation, and feeding the first and second portions of cool compressed gaseous mixture to the fractionating operation.

5. The method of separating air by a fractionating operation in which operation compressed air is refrigerated and supplied to a fractionating zone having a high pressure stage and a low pressure stage when the air is separated into cold nitrogen component gas and cold oxygen component gas, comprising the steps of compressing air to provide major and minor portions of compressed air containing high boiling point carbon dioxide impurity, flowing the major portion of compressed air in one direction through a first path and flowing a first portion of cold nitrogen component gas in the opposite direction in heat exchange effecting relation with the first path during one period of the heat interchange to thereby cool the major portion of compressed air and congeal high boiling point carbon dioxide impurity along the first path, flowing the first portion of cold nitrogen component gas through the first path in the opposite direction in contact with congealed high boiling point carbon dioxide impurity in a second period of the heat interchange, proportioning the relative mass of the first portion of cold nitrogen component gas and the major portion of compressed air so that the first portion of cold nitrogen component gas sweeps out congealed high boiling point carbon dioxide impurity during the second period of the heat interchange, passing the minor portion of compressed air in one direction through a second path and flowing the remaining portion of cold nitrogen component gas and the cold oxygen component gas in the opposite direction in heat exchange effecting relation with the second path to thereby cool the minor portion of compressed air, removing high boiling point carbon dioxide impurity from the minor portion of compressed air without the second path, withdrawing a stream of cold nitrogen gas from the high pressure stage of the fractionating zone, passing the withdrawn stream in heat exchange effecting relation with at least a portion of the second path to cool the minor portion of compressed air to about the same temperature as the major portion of compressed air leaving the first path to warm the withdrawn stream, expanding the withdrawn stream and adding the effluent of the expansion step to cold nitrogen component gas from the low pressure stage, and feeding the major and minor portions of cool compressed air to the fractionating zone.

6. A method of separating gaseous mixtures into components by a fractionating operation, in which operation compressed gaseous mixture is refrigerated by heat interchange with cold component gas and supplied to a fractionating zone where the gaseous mixture is separated into low boiling point component gas and high boiling point cold component gas, comprising the steps of compressing gaseous mixture to provide first and second portions of compressed gaseous mixture containing high boiling point impurity, flowing the first portion of compressed gaseous mixture in one direction through a first path and flowing a first portion of low boiling point component gas in the opposite direction in heat exchange effecting relation with the first path during one period of the heat interchange to thereby cool the first portion of compressed gaseous mixture and congeal high boiling point impurity along the first path, flowing the first portion of low boiling point component gas through the first path in the opposite direction in contact with congealed impurity during a second period of the heat inteerchange, proportioning the relative mass of the first portion of the low boiling point component gas and the first portion of compressed gaseous mixture so that the first portion of low boiling point component gas sweeps out congealed impurity during the second period of the heat interchange, flowing the second portion of compressed gaseous mixture in one direction through a second path and flowing the remaining portion of the low boiling point component gas and the high boiling point component gas through separate paths and in the opposite direction in heat exchange effecting relation with the second path to thereby cool the second portion of compressed gaseous mixture, removing high boiling point impurity from the second portion of compressed gaseous mixture without the second path, and feeding the first and second portions of cool compressed gaseous mixture to the fractionating operation.

7. Apparatus for separating gaseous mixtures by a fractionating operation, in which operation compressed gaseous mixture is refrigerated and supplied to a fractionating column where the gaseous mixture is separated into cold component gases having different boiling points, comprising means for compressing gaseous mixture to provide first and second portions of compressed gaseous mixture containing high boiling point impurity, means for flowing the first portion of compressed gaseous mixture in one direction through a first path and flowing a first portion of one component gas in the opposite direction in heat exchange effecting relation with the first path throughout the length of the first path during one period of heat interchange to thereby cool the first portion of compressed gaseous mixture and congealed high boiling point impurity along the first path, means flowing the first portion of one component gas through the first path in the opposite direction in contact with congealed impurities during the second period of the heat interchange, means proportioning the first portion of one component gas and the first portion of compressed gaseous mixture so that the first portion of one component gas sweeps out congealed impurities during the second period of the heat interchange, means passing the second portion of compressed gaseous mixture in one direction through a second path and flowing a second portion of one component gas and another component gas in the opposite direction in heat exchange effecting relation with the second path throughout the length of the second path to thereby cool the second portion of compressed gaseous mixture, means removing high boiling point impurity from the second portion of compressed gaseous mixture without the second path, and means feeding the first and second portions of cool compressed gaseous mixture to the fractionating operation.

8. Apparatus for separating gaseous mixtures by a fractionating operation, in which compressed gaseous mixture is refrigerated and supplied to a fractionating column where the gaseous mixture is separated into cold component gases having different boiling points, comprising first compressor means providing a first portion of compressed gaseous mixture, second compressor means providing a second portion of compressed gaseous mixture, a first heat exchanger including two paths in heat exchange effecting relation, means flowing the first portion of compressed gaseous mixture in one direction through a first path of the first heat exchanger and flowing a first portion of one component gas in the opposite direction through a second path of the first heat exchanger during one period of heat interchange to thereby cool the first portion of compressed gaseous mixture and congeal high boiling point imprity along the first path, means for switching the flow of the first portion of one component gas and the first portion of compressed gaseous mixture through the first heat exchanger so that the first portion of one component gas flows through the first path in the opposite direction in contact with congealed impurity during a second period of the heat interchange, means proportioning the relative mass of the first portion of one component gas and the first portion of compressed gaseous mixture so that the first portion of the one component gas sweeps out congealed impurity during the second period of the heat interchange, a second heat exchanger including three paths in heat exchange relationship, means passing the second portion of compressed gaseous mixture in one direction through one path of the second heat exchanger, means flowing a second portion of one component gas through a second path of the second heat exchanger in an opposite direction relative to the flow of the second portion of the compressed gaseous mixture, means flowing another component gas through the third path of the second heat exchanger in the opposite direction, means located without the second heat exchanger for removing high boiling point impurity from the second portion of compressed gaseous mixture, and means feeding the first and second portions of cool compressed gaseous mixture to the fractionating column.

9. Apparatus for separating gaseous mixtures by a fractionating operation, in which operation compressed gaseous mixture is refrigerated and supplied to a fractionating column where the mixture is separated into a low boiling point component gas and high boiling point component gas, comprising compressor means for providing first and second portions of compressed gaseous mixture containing high boiling point impurity, means flowing the first portion of compressed gaseous mixture in one direction through a first path and flowing a first portion of low boiling point component gas in the opposite direction in heat exchange effecting relation with the first path during one period of the heat interchange to thereby cool the first portion of compressed gaseous mixture and congeal high boiling point impurity along the first path, means flowing the first portion of low boiling point component gas through the first path in the opposite direction in contact with congealed impurity during a second period of the heat interchange, means proportioning the relative mass of the first portion of low boiling point component gas and the first portion of compressed gaseous mixture so that the first portion of low boiling point component gas sweeps out congealed impurity during the second period of the heat interchange, means flowing the second portion of compressed gaseous mixture in one direction through a second path and flowing a second portion of a low boiling point component gas and high boiling point component gas in the opposite direction in heat exchange effecting relation with the second path to thereby cool the second portion of compressed gaseous mixture, means located without the second path for removing high boiling point impurity from the second portion of compressed gaseous mixture, and means feeding the first and second portions of cool compressed gaseous mixture to the fractionating column.

10. Apparatus for separating gaseous mixtures by a fractionating operation, in which operation compressed gaseous mixture is refrigerated and supplied to a fractionating column where the gaseous mixture is separated into low boiling point component gas and high boiling point component gas, comprising first compressor means for providing a first portion of compressed gaseous mixture containing high boiling point impurity, second compressor means for providing a second portion of compressed gaseous mixture containing high boiling point impurity, a first heat exchanger including a pair of paths in heat exchange relationship, means for passing the first portion of compressed gaseous mixture in one direction through a first path of the first heat exchanger and for flowing a first portion of low boiling point component gas in the opposite direction through the second path of the first heat exchanger to thereby cool the first portion of compressed gaseous mixture and congeal high boiling point impurity along the first path, means reversing the flow of the first portion of compressed gaseous mixture and the first portion of low boiling point component gas in the first heat exchanger to flow the first portion of the low boiling point component gas through the first path in the opposite direction in contact with congealed impurity, means proportioning the relative mass of the first portion of the low boiling point component gas and the first portion of compressed gaseous mixture so that the first portion of low boiling point component gas sweeps out congealed impurity, a second heat exchanger including three separate paths in heat exchange relationship, means flowing the second portion of compressed gaseous mixture in one direction through a first path of the second heat exchanger, means flowing the remaining portion of the low boiling point component gas through a second path of the second heat exchanger in a second direction opposite the flow of the second portion of compressed gaseous mixture, means for flowing the high boiling point component gas through the third path of the second heat exchanger in the second direction, means located outside of the second heat exchanger for removing high boiling point impurity from the second portion of compressed gaseous mixture, and means for feeding the first and second portions of cool compressed gaseous mixture to the fractionating column.

11. Apparatus for separating air by a fractionating operation, in which operation compressed air is refrigerated and supplied to a fractionating column having a high pressure stage and a low pressure stage where the air is separated into cold nitrogen component gas and cold oxygen component gas, comprising compressor means for providing major and minor portions of compressed air containing high boiling point carbon dioxide impurity, means flowing the major portion of compressed air in one direction through a first path and flowing a first portion of cold nitrogen component gas in the opposite direction in heat exchange effecting relation with the first path during one period of the heat interchange to thereby cool the major portion of compressed air and congeal high boiling point carbon dioxide impurity along the first path, means flowing the first portion of cold nitrogen component gas through the first path in the opposite direction in contact with congealed high boiling point carbon dioxide impurity in a second period of the heat interchange, means proportioning the relative mass of the first portion of cold nitrogen component gas and the major portion of compressed air so that the first portion of cold nitrogen component gas sweeps out congealed high boiling point carbon dioxide impurity during the second period of the heat interchange, means passing the minor portion of compressed air in one direction through a second path and flowing the remaining portion of cold nitrogen component gas and the cold oxygen component gas in the opposite direction in heat exchange effecting relation with the second path to thereby cool the minor portion of compressed air, means located outside of the second path for removing high boiling point carbon dioxide impurity from the minor portion of compressed air, means withdrawing a stream of cold nitrogen gas from the high pressure stage of the fractionating column, means passing the withdrawn stream in heat exchange effecting relation with at least a portion of the second path to cool the minor portion of compressed air to about the same temperature as the major portion of compressed air leaving the first path to thereby warm the withdrawn stream, means expanding the warm stream, means adding the effluent of the expansion step to cold nitrogen component gas from the low pressure stage, and means feeding the major and minor portions of cool compressed air to the fractionating column.

References Cited in the file of this patent
UNITED STATES PATENTS

| | | |
|---|---|---|
| 2,105,214 | De Baufre | Jan. 11, 1938 |
| 2,355,660 | Le Rouge | Aug. 14, 1944 |
| 2,504,051 | Scheibel | Apr. 11, 1950 |
| 2,579,498 | Jenny | Dec. 25, 1951 |
| 2,673,456 | Scharmann | Mar. 30, 1954 |
| 2,699,047 | Kawart et al. | Jan. 11, 1955 |
| 2,918,802 | Grunberg | Dec. 29, 1959 |
| 2,932,174 | Schilling | Apr. 12, 1960 |